United States Patent
Richmond

(10) Patent No.: US 8,576,108 B1
(45) Date of Patent: Nov. 5, 2013

(54) PASSIVE EXPENDABLE DECOY

(75) Inventor: Martin R. Richmond, Lexington, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 06/189,274

(22) Filed: Sep. 22, 1980

(51) Int. Cl.
*G01S 7/38* (2006.01)

(52) U.S. Cl.
USPC .................................. 342/9; 342/13

(58) Field of Classification Search
USPC ....................... 342/5, 8–10, 13–15
See application file for complete search history.

(56) References Cited

U.S. PATENT DOCUMENTS

| | | | | |
|---|---|---|---|---|
| 2,502,650 | A * | 4/1950 | Harris et al. | |
| 3,126,544 | A * | 3/1964 | Greatbatch, Jr. | |
| 3,283,324 | A * | 11/1966 | Norman, Jr. | |
| 3,566,317 | A * | 2/1971 | Hafner | |
| 3,568,191 | A * | 3/1971 | Hiester et al. | 342/8 |
| 3,715,754 | A * | 2/1973 | Parry | 342/12 |
| 3,900,849 | A * | 8/1975 | Scott et al. | 342/6 |
| 3,938,151 | A * | 2/1976 | Trenam | 342/10 |
| 3,986,188 | A * | 10/1976 | True | 342/14 |
| 4,130,059 | A * | 12/1978 | Block et al. | 102/351 |
| 4,149,166 | A * | 4/1979 | Null | |
| 4,233,605 | A * | 11/1980 | Coleman | 342/6 |
| 4,890,109 | A * | 12/1989 | Gagliardi | 342/14 |
| 6,429,800 | B1 * | 8/2002 | Richmond | 342/14 |

* cited by examiner

*Primary Examiner* — John B Sotomayor
(74) *Attorney, Agent, or Firm* — Daniel J. Long

(57) ABSTRACT

In one embodiment, a passive expendable decoy for an aircraft is provided by ejecting passive radiators from the aircraft along a transmission line trailing from the aircraft and excited by a jammer on the aircraft, such that the radiators accelerate under aerodynamic drag forces to the end of the transmission line and couple energy from the transmission line to free space. This provides angular deception to a tracking radar or homing missile since the point of radiation along the transmission line is determined by the instantaneous position of the expendable radiating element.

15 Claims, 2 Drawing Sheets

PASSIVE EXPENDABLE DECOY

BACKGROUND OF THE INVENTION

This invention relates to countermeasure techniques for protecting aircraft from enemy attack and, more particularly, to a means of protecting an aircraft by deceiving an enemy into tracking a decoy target.

Various systems are being employed and have been proposed for protecting aircraft from enemy attack including the use of jamming equipment on the aircraft. When the threat is from tracking radars or missile seekers employing monopulse or pseudo-monopulse angular error sensing mechanisms the difficulty of countermeasures increases since few electronic countermeasures techniques exist. One of the well known techniques is that of producing false targets at a physical distance from the aircraft under attack.

One means of producing such false targets is to employ expendable active decoys. These devices are ejected at an angle from an aircraft when under attack and usually contain active electronic components (which usually include a repeater or transponder). The repeater or transponder duplicates the incoming signal from the enemy radar but provides misinformation as to the doppler and bearing of the aircraft under attack due to the different velocity of the ejected decoy and the angular difference between the ejected decoy and the "true" target.

While such expendable active decoys have proven successful, they are limited in power level, bandwidth, cost and size. To be useful their size must be sufficiently small such that a fair number of them can be carried aboard an aircraft. Therefore, the amount of electronics incorporated therein must be reasonably limited occasioning a limitation in bandwidth and power level which they output. Notwithstanding the size limitations which have been imposed, the expendable active decoys are still relatively large and costly and the number which can be carried aboard an aircraft during a mission is limited.

Accordingly, it is an object of this invention to provide improved electronic countermeasures.

It is another object of this invention to provide an improved expendable decoy.

SUMMARY OF THE INVENTION

Briefly, in one embodiment of the invention, improved electronic countermeasures is achieved by trailing from an aircraft an amount of wire or other surface wave transmission line. A conical horn, coupled to the aircraft's on-board jammer, in conventional fashion launches onto the surface wave transmission line the output of the on-board jammer. A passive radiator is then loosely attached to the trailing line at the end thereof and propelled along the line under aerodynamic drag forces. The passive radiator will extract substantial amounts of energy from the line and radiate it thereby simulating an expendable active decoy moving away from the aircraft.

Since the passive radiator contains no active electronic components its size can be minimized and, thus, an aircraft can carry great numbers of them during a mission. Size also is no longer a limiting factor in bandwidth and power level of the signal radiated by the decoy since the energy is all supplied by the on-board jammer of the aircraft.

In an alternate embodiment an expendable active decoy is simulated by providing a radiator at the end of a surface wave transmission line. The transmission line is wound, for example, on a reel and payed out of the aircraft when under attack. While the line is payed out from the aircraft, it is excited by the aircraft on-board jammer such that as the radiator is payed out it also simulates an active expendable decoy moving away from the aircraft.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
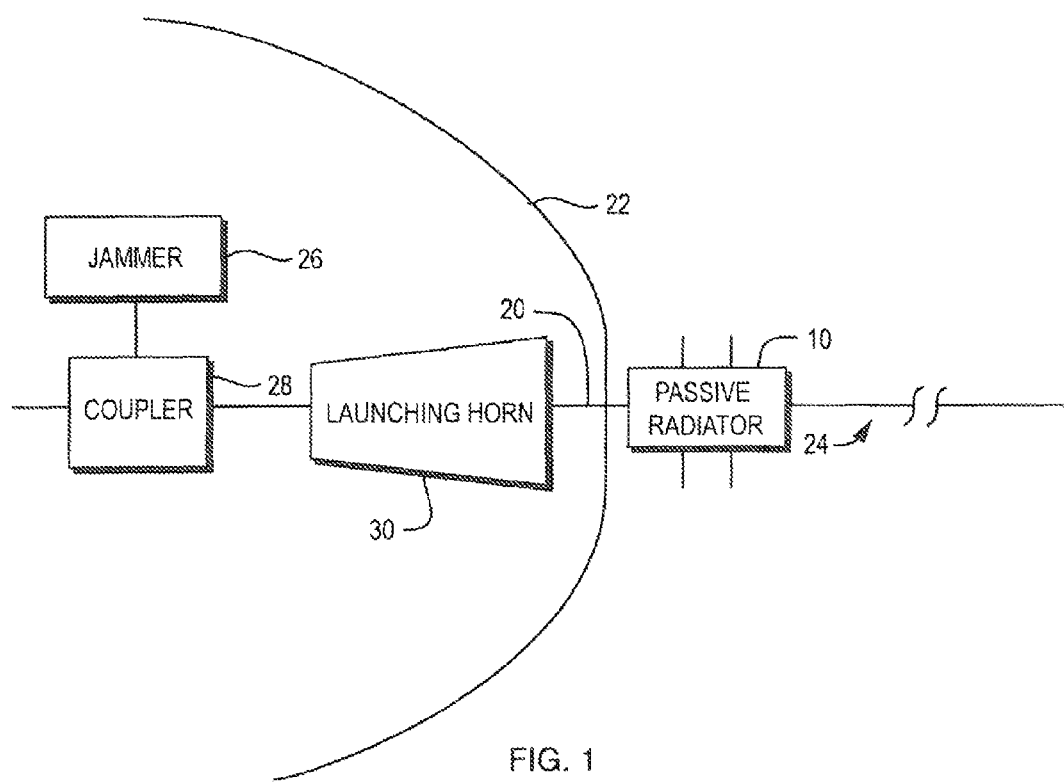
FIG. 1 is a representation of a passive expendable decoy jamming system.
Figure 2:
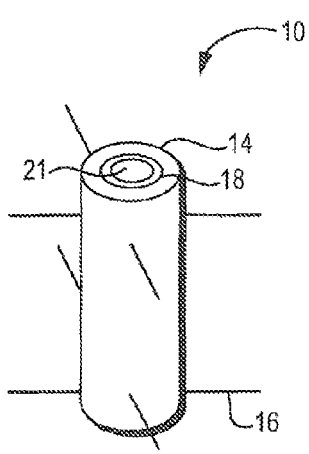
FIG. 2 is a perspective view of a exemplary radiating element employed in the system of FIG. 1.

Referring now to FIG. 1 of the drawings, there is illustrated thereby an embodiment of an expendable decoy. The expendable decoy in this embodiment comprises a passive radiating element 10, one embodiment of which is shown in greater detail in FIG. 2. The radiating element comprises a metal sleeve 14 having dipoles 16 affixed thereto. The metal sleeve is concentrically aligned about an inner sleeve of dielectric material. The radiating element 10 has a hole 21 therein so that it can be loosely attached to a transmission line 20 which is positioned with respect to an aircraft 22 in such a manner that a portion 24 trails therefrom. Other radiating elements may be used instead. Such devices only must be capable of coupling energy from transmission line 20 to free space. In its simplest form a slotted short section of tubing will suffice.

In the preferred embodiment, transmission line 20 is a surface wave transmission line or Goubau line. This type of transmission line is preferred because of its extremely low loss, much lower than solid coaxial cable. In its simplest form line 20 is a single length of wire coated with an insulation. However, other embodiments will be described hereinafter. Because of the low loss of such lines tactical operation may employ a line on the order of 500 feet long and having an attenuation only on the order of 10 dB.

Transmission line 20 is payed out of aircraft 22 such that a fixed length 24 thereof remains outside the aircraft. The output of the normal jammer 26 within the aircraft is coupled to the transmission line via a coupler 28 and a launching horn 30 in conventional fashion.

When aircraft 22 is under attack, passive radiating elements 10 are loosely attached to transmission line 20 and propelled along the line to the end thereof by aerodynamic forces. The radiating elements extract energy from the line and radiate it. Thus, as the radiating elements move outwardly along the line 20 radiating energy coupled from the line, they simulate an expendable active decoy.

Since the radiating elements 20 are passive elements they can be made quite small and, accordingly, substantial numbers of them can be carried by an aircraft during a mission. Also, since the energy radiated by the elements 20 is derived from the power output of the jammer 26 in the aircraft, power and bandwidth are not limited as is the case with active expendable decoys.

The trailing transmission line 24 can be made long enough to provide adequate angular deception to a tracking radar or homing missile. Angular deception occurs because the point of radiation along the transmission line is determined by the instantaneous position of the expendable radiating elements 10. To simulate a series of active expendable jammers a new radiating element 10 is inserted at the near end of line 20 as one is dropped from the far end of the transmission line.

Figure 3:
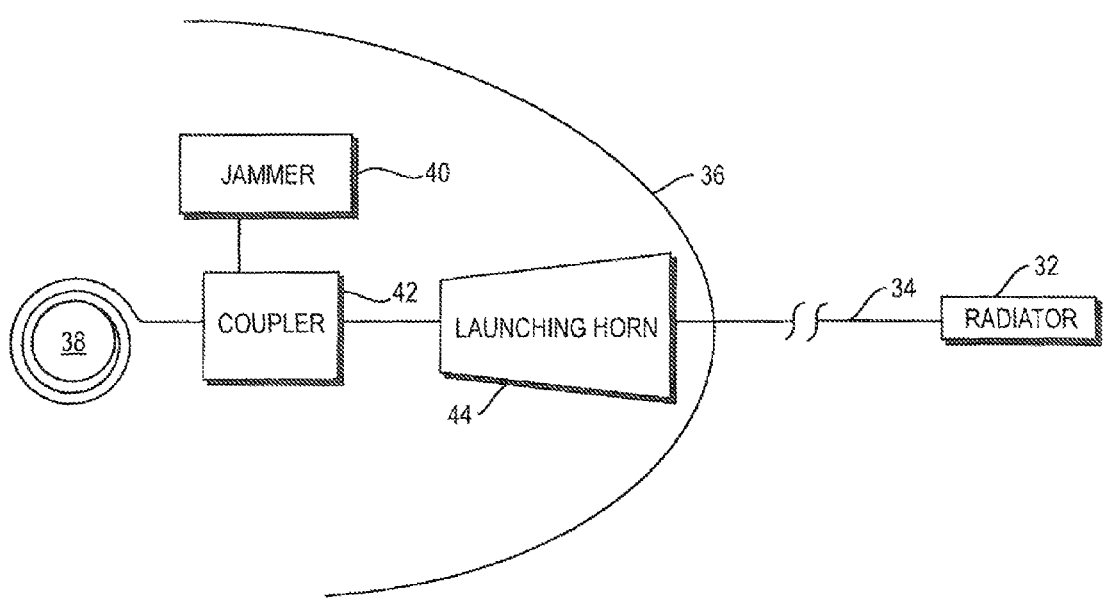
FIG. 3 is a representation of an alternate embodiment of a passive expendable decoy jamming system.

An alternate embodiment of the invention is illustrated in FIG. 3 of the drawings. In this embodiment, rather than paying out a length of wire and allowing radiators to traverse the length of payed out wire, a radiator 32 is affixed to the end of a transmission line 34. The transmission line 34 is maintained within an aircraft 36, for example, wound upon an inertialess reel 38. When the aircraft is under attack the line 34, having the radiator 32 at the end thereof, is payed out of the aircraft. While the line is being payed out of the aircraft, power is applied thereto from the aircraft jammer 40 via a coupler 42 and launching horn 44. Thus as the radiator is being payed out of the aircraft it will couple energy from the transmission line 34 to free space simulating an active expendable jammer moving away from the aircraft and, thus, providing angular deception to a tracking radar or homing missile.

When surface wave transmission lines are employed in the above-mentioned embodiments it is necessary to maintain the level of radiation from the mouth of the launching horns well below that radiated from the radiators. The fraction of radiated energy versus that delivered to the line is a function of wavelength, horn-to-wire diameter ratio and the impedance of the line as determined by the dielectric loading.

The lower the impedance (more dielectric) the lower the ratio of horn-to-wire diameter can be for a given percentage leakage radiation. However, lower impedance lines would have more attenuation for a given length of line. A higher impedance line of acceptable loss will require an inordinately large horn diameter.

Figure 4:
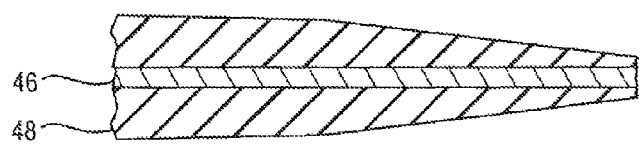
FIG. 4 is a cross-sectional representation of a portion of a surface wave transmission line which may be employed in the embodiments of FIGS. 1 and 3.

The problem is circumvented by initiating the surface wave at a low impedance level, and then tapering the wire-to-dielectric ratio over a small distance until the impedance rises to acceptable levels. The attenuation per foot for the short section of low impedance line would be greater than that of the higher impedance but since a relatively short length is involved, negligible total additional attenuation will result. This is illustrated in FIG. 4 of the drawings showing the tapered ratio of wire 46 to dielectric 48.

Since the loss for the surface wave transmission line is predominately copper loss, the size of the wire has an inverse relationship to loss. However, only a small depth of copper wire is actually effective, due to skin effect, and loss becomes related to the circumference, rather than the cross-sectional area of the wire. Thus, instead of using a round wire for the surface wave transmission line a ribbon of thickness equal to or greater than the skin depth can be employed. For a given cross-section area of line, the loss will be much lower. Also, since weight and reeling and stowing are considerations, the ribbon is very attractive relative to round wire.

Figure 5:
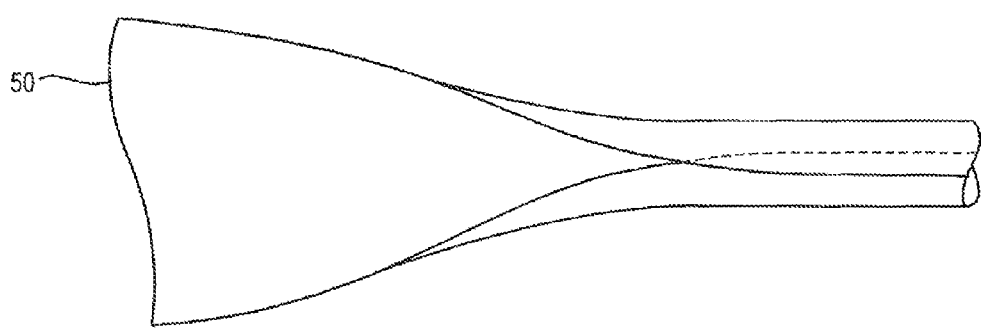
FIG. 5 is a perspective view of an alternate embodiment of a surface wave transmission line which may be employed in the embodiments of FIGS. 1 and 3.

One configuration of same as shown in FIG. 5 wherein a ribbon 50 is stowed flat on a reel and as it unreels it curls to form a tube. The ribbon 50 is preferably made of beryllium copper or other material which will form upon being payed out from the reel.

In the embodiments disclosed, the attenuation of the transmission line increases as the radiator moves away from the aircraft such that the signal from the radiator will decrease. However, before the attenuation increases substantially, the decoy will have captured the range gate and/or speed gate of the enemy radar and therefore, it is no longer competing with the aircraft itself.

Although certain embodiments of radiators and transmission lines for the passive expendable decoys have been disclosed, others will be readily apparent to those skilled in the art. For example, instead of providing individual radiators for the aircraft, machinery can be provided to appropriately form stock material fed into the machinery to actually make the radiators within the aircraft itself and, if desired, to automatically feed them onto the transmission line. Thus, it is to be understood that the embodiments shown are illustrative only, and that many variations and modifications may be made without departing from the principles of the invention herein disclosed and defined by the appended claims.

I claim:

1. A passive expendable decoy, comprising:
a length of transmission line;
means for applying energy to said transmission line; and
a radiator coupled to said transmission in such a manner that it will traverse said transmission line and couple energy therefrom to free space.

2. A passive expendable decoy as defined in claim 1 wherein said transmission line is a surface wave transmission line.

3. A passive expendable decoy as defined in claim 2 wherein said energy applying means includes a launching horn.

4. A passive expendable decoy as defined in claim 3 wherein the section of transmission line proximate said launching horn is a dielectric coated wire having a tapered wire-to-dielectric ratio.

5. A passive expendable decoy as defined in claim 2 wherein said surface wave transmission line is a ribbon loaded so as to bend when unfurled.

6. A passive expendable decoy for use with aircraft, comprising:
a transmission line;
a radiator disposed at the end of said transmission line;
means for discharging said transmission line from said aircraft; and
means for applying energy to said transmission line while it is being discharged.

7. A passive expendable decoy as defined in claim 6 wherein said transmission line is a surface wave transmission line.

8. A passive expendable decoy as defined in claim 7 wherein said energy applying means includes a launching horn.

9. A passive expendable decoy as defined in claim 8 wherein the section of transmission line proximate said launching horn is a dielectric coated wire having a tapered wire-to-dielectric ratio.

10. A passive expendable decoy as defined in claim 7 wherein said surface wave transmission line is a ribbon loaded so as to bend when unfurled.

11. A method for protecting aircraft against enemy radars, comprising the steps of:
providing a transmission line outside the aircraft;
applying energy to said transmission line; and
ejecting a radiator from said aircraft along said transmission line in a manner that will couple energy from said transmission line to free space.

12. A method of protecting aircraft against enemy radars, comprising the steps of:

providing a transmission line having a radiator at the end thereof within the aircraft;

discharging said transmission line from the aircraft; and applying energy to said discharged transmission line while it is being discharged from the aircraft.

13. The method of claim 12 wherein said transmission line is furled and said discharging includes unfurling said transmission line.

14. A method for protecting aircraft against enemy radars, comprising the steps of:

providing a transmission line;

applying energy to said transmission line from within the aircraft;

coupling a radiator to said transmission line in a manner that will couple energy from said transmission line to free space; and moving said radiator away from the aircraft.

15. Apparatus for protecting aircraft against enemy radars, comprising:

a transmission line;

means for applying energy to said transmission line;

a radiator coupled to said transmission line so as to couple energy from said transmission line to free space; and means for moving said radiator away from said aircraft as it is coupling energy from said transmission line.

* * * * *